J. H. PARSONS AND A. MERRICK.
CONDENSER OR MUFFLER FOR INTERNAL COMBUSTION ENGINES.
APPLICATION FILED FEB. 14, 1918.
1,363,345.
Patented Dec. 28, 1920.
3 SHEETS—SHEET 3.
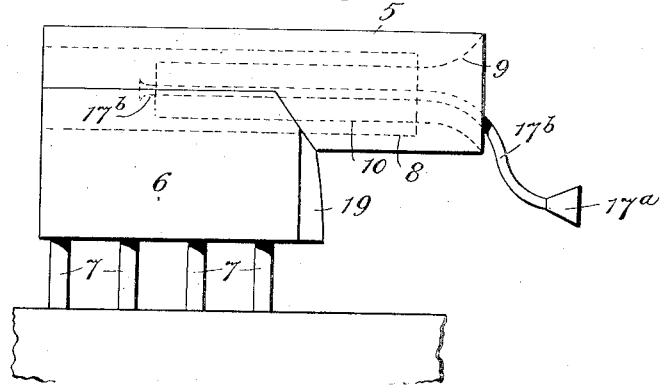
Fig. 6.
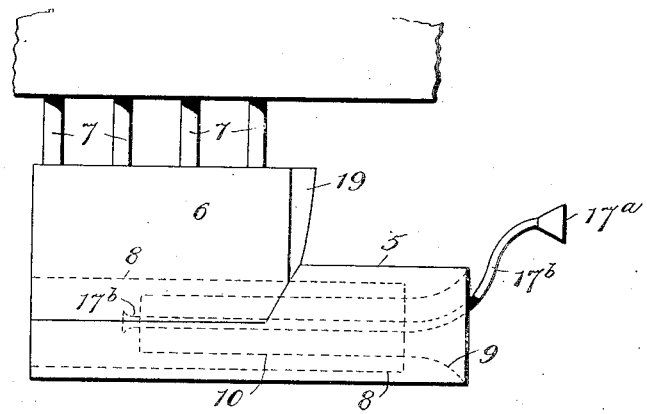
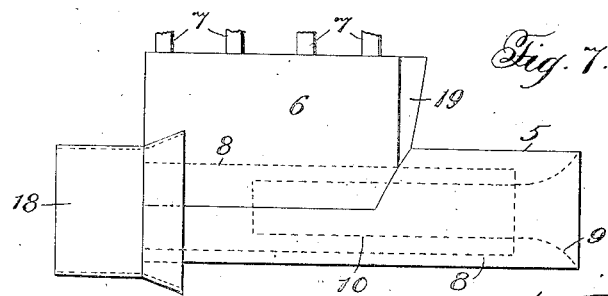
Fig. 7.

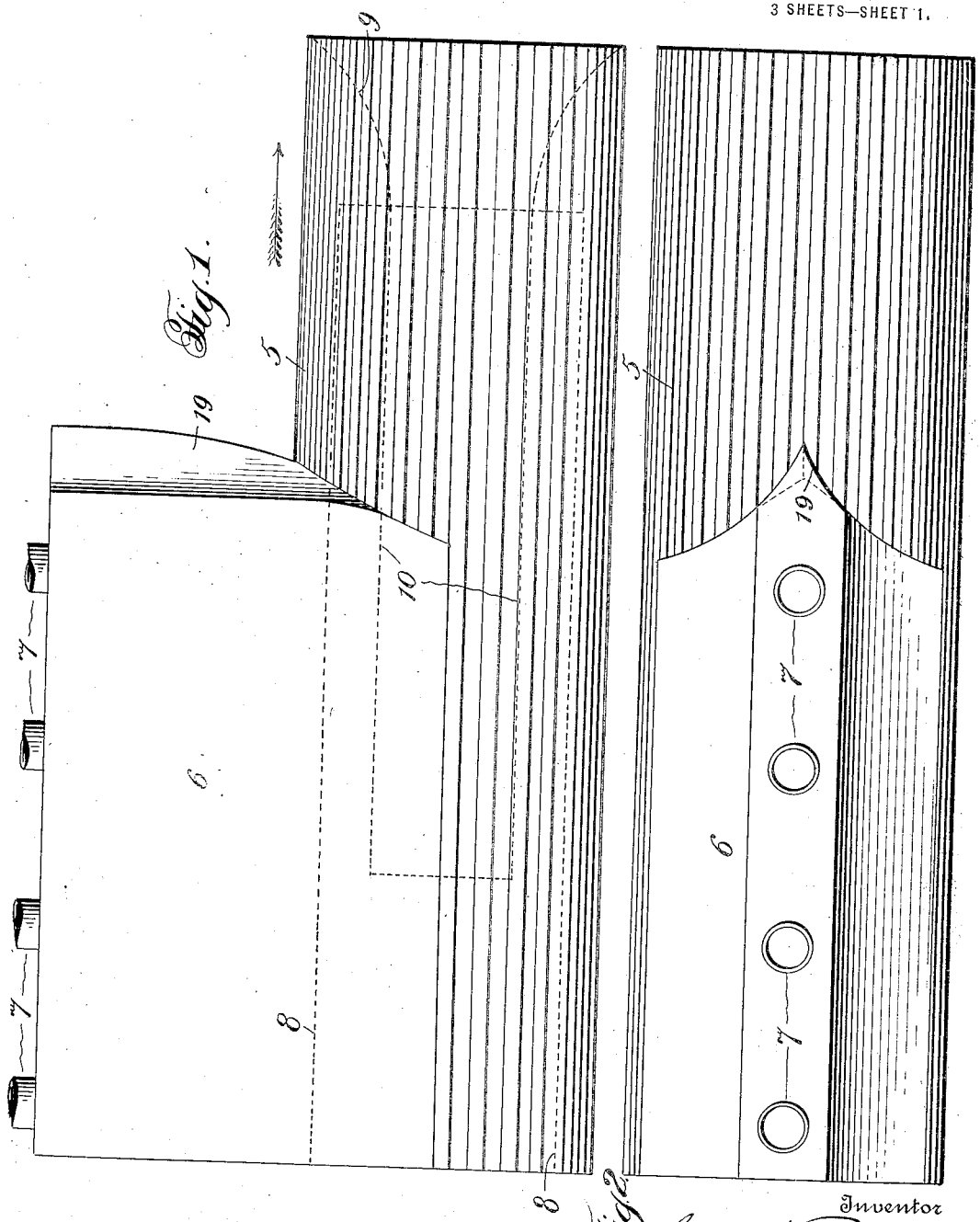

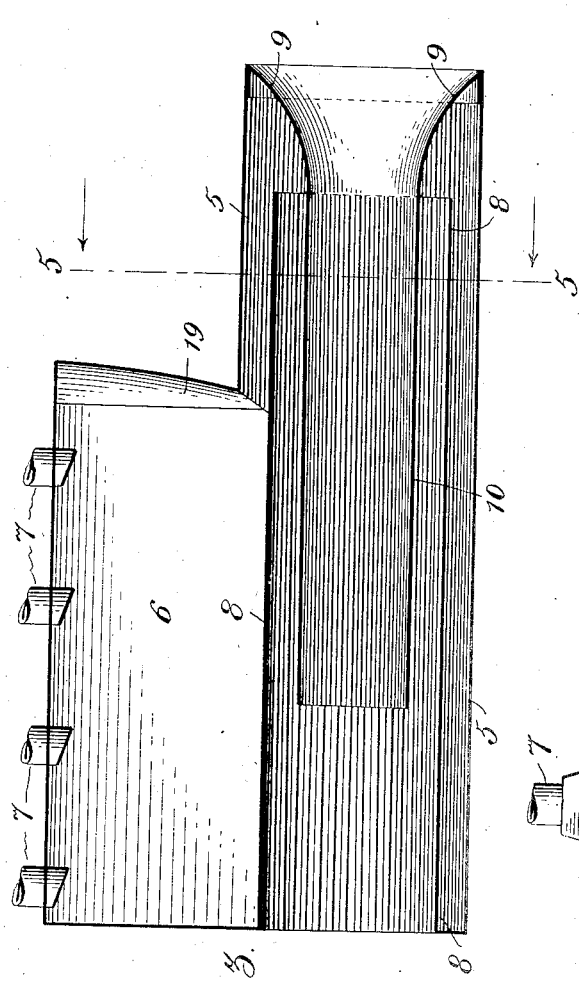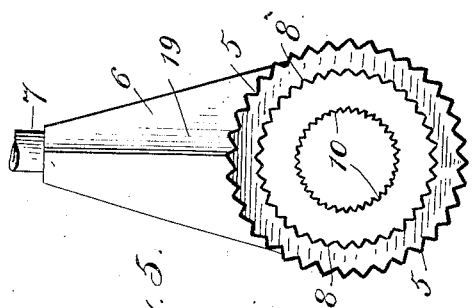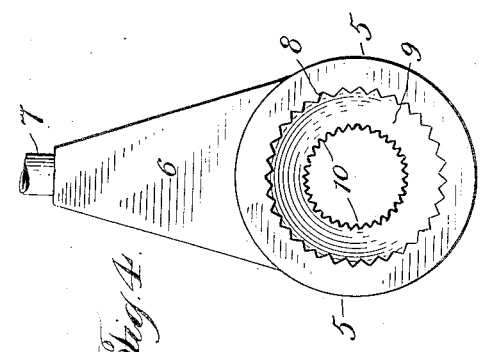

UNITED STATES PATENT OFFICE.

JOHN H. PARSONS AND ANSON A. MERRICK, OF RIDLEY PARK, PENNSYLVANIA.

CONDENSER OR MUFFLER FOR INTERNAL-COMBUSTION ENGINES.

1,363,345.  Specification of Letters Patent.  Patented Dec. 28, 1920.

Application filed February 14, 1918. Serial No. 217,290.

*To all whom it may concern:*

Be it known that we, JOHN H. PARSONS and ANSON A. MERRICK, citizens of the United States, residing at Ridley Park, in the county of Delaware and State of Pennsylvania, have invented certain new and useful Improvements in Condensers or Mufflers for Internal-Combustion Engines, of which the following is a specification, reference being had therein to the accompanying drawing.

This invention relates to improvements in condensers and mufflers for internal combustion engines, and is particularly adapted for use with the Curtiss airplane engine, but may, with but slight modification, be applied to any airplane engine, and also to automobiles, motor-cycles, motor boat and other internal combustion engines.

The object of the invention is to provide a device that will permit of the free and unobstructed passage for the spent gases through the same, and which will discharge the gases at the rear end without noise and with but little, if any, smoke.

A further object is to provide means for creating and maintaining a partial vacuum in the expansion chamber thereby reducing back pressure on the pistons and increasing the power of the engine.

A further object is to provide a construction adapted to equalize the flow of spent gases, cool them in their passage through the apparatus so as to reduce their volume, and commingle them with slightly warmed air before discharging them into the outside air.

With these and other objects in view, our invention consists in the parts and combinations of parts as will be more fully described and pointed out in the claims.

In the accompanying drawings:

Figure 1 is a top plan view of the condenser and muffler embodying our invention;

Fig. 2 is a side elevation thereof;

Fig. 3 is a longitudinal section of the device;

Fig. 4 is a rear end view of the same;

Fig. 5 is a transverse sectional view of the device taken on the line 5—5 of Fig 3;

Fig. 6 is a top plan view of the arrangement of two condensers or mufflers constructed in accordance with my invention, showing the same connected to an internal combustion engine, and furthermore illustrating auxiliary air supply devices for the condenser, and Fig. 7 is a side elevation of the device showing the "booster" funnel.

The condenser or muffler consists of a cylindrical casing 5 made of sheet or cast metal as desired, provided at its outlet end with an enlargement forming an expansion chamber 6 having one or more pipe connections 7 in one wall thereof, for the discharge pipe or pipes of the engine. We prefer to have the discharge pipe from each cylinder of the engine discharge directly into the expansion chamber 6.

This chamber 6 is in open communication with the interior of the casing 5, which latter is preferably cylindrical and corrugated as shown and is provided interiorly with a cylinder 8, which latter is open at both ends, its rear end communicating with an opening in the rear end closure of casing 5, and its front end terminating within the casing intermediate the front end of the latter and the expansion chamber 6. This cylinder or conduit 8 is also preferably corrugated and is concentric with the casing 5 and constitutes the outlet from the expansion chamber 6 of the spent gases.

Secured to the front end of the casing 5 is the bell or funnel shaped end 9 of the air pipe 10, also preferably corrugated, and which extends well into cylinder 8, sufficient space being left between the pipe 10 and the cylinder 8 for the free passage of the gases from the expansion chamber.

The cylinder 8 extends from the rear end of the casing 5 to a point adjacent the front end of the latter, and the pipe 10 extends from the front end of said casing for a considerable distance into the cylinder. This cylinder is considerably smaller than the casing so as to provide an ample gas passage between the latter and the cylinder, and the pipe 10 is likewise proportioned to the cylinder, so as to provide for a gas passage between them, the said passages being ample to take care of all the spent gases entering the expansion chamber. The front end of the pipe 10 is, as before explained, funnel shaped, and is of the same size at its outer end as the casing, so that the air opening to the pipe is of the same diameter as the casing.

The apparatus, as described, is, as stated above, particularly designed for use with flying machines and when in use its front end is toward the front of the machine so that a strong current of air will be drawn or forced through the funnel shaped pipe 10 into and through the cylinder 8 and be discharged at the rear open end of the latter.

The space within the expansion chamber is sufficiently large so that the gases as they are exhausted from the cylinders can expand immediately, and as the whole of the outer surface of the casing is exposed to the outer air, and preferably corrugated, as shown, so as to increase its surface area, it will be cooled and kept comparatively cool. The air passing through the pipe 10 and the cylinder 8 keeps the latter comparatively cool, so that the gases, after they enter the expansion chamber and casing will be cooled by contact with the latter and also by the cylinder 8 and air pipe 10, and as they pass the rear end of the pipe 10 they will be further cooled by contact with the air with which they commingle.

The movement of the apparatus in the direction of the arrow creates a strong current of air through the funnel and pipe 10, and the passage of the air from the pipe 10 into the cylinder 8 creates a suction in the cylinder in front of the rear end of pipe 10, which suction operates to draw the gases from the expansion chamber 6, forwardly and into the front end of the cylinder and then rearwardly through said cylinder, from whence they are rapidly expelled by the air current passing through the latter.

The gases begin to expand immediately on entering the expansion chamber, and from this point said gases begin to cool and as they cool they contract so that by the time the gases pass the rear end of pipe 10, and commingle with the air in the cylinder 8, they are considerably reduced in temperature and volume and are expelled without noise or smoke.

Again, by constructing the apparatus so that a current of air passes through the cylinder 8 when the vehicle with which the apparatus is used is moving forwardly, the gases will be drawn from the expansion chamber and casing into the open cylinder from which they have free egress, thus absolutely preventing the accumulation of any back pressure within the casing 5.

When two series of cylinders are used, as in Fig. 6, one muffler may be connected with each series, and the air supply to the two mufflers may be increased by providing a separate funnel shaped receiver 17$^a$ having a discharge pipe 17$^b$ leading to each muffler, the same discharging at a point just beyond the rear end of the pipe 10. This additional funnel may be used when only one muffler is employed, as will be obvious, the idea being to provide for an increased air supply for cooling the walls of the device and creating a greater suction therein.

Furthermore, a "booster" funnel 18 may be provided upon the rear end of the casing 5, as clearly shown in Fig. 7, whereby the suction of the air passing through this funnel and around the rear end of the casing 5, will cause an efficient and additional means for drawing or pulling the spent gases from the casing and discharging them into the open air.

It is to be noted that the forward end wall of the expansion chamber is V-shaped in cross section, as clearly shown at 19 in the drawing, and due to the rearwardly inclined walls of this V-shaped end section, and furthermore, due to the shape of the funnel end 9 of the casing 5, (it being noted that rather sharp angles are presented to the air in the direction of movement of the device through the air) the device, as shown herein, offers very little resistance upon the air in the use of the device, and in any event a material reduction of wind resistance is provided.

The theory and operation of the apparatus is as follows:—

The combustion of the gasolene vapor and air in the cylinders of an internal combustion engine forms a mixture of gases, nitrogen, etc., at a high pressure and temperature. The pressure generated forces the piston out, thus reducing the pressure and temperature by increasing the volume. Before the gases are cooled to atmospheric temperature and reduced to atmospheic pressure the exhaust valve opens and releases these gases into the atmosphere against atmospheric pressure. Since the gases must force the air aside they must overcome the atmospheric pressure and in doing so exert a back pressure against the piston of 14.7 lbs. per square inch.

The hot gases escaping expand as soon as released and are cooled instantaneously in passing through the device in a thin film or layer in contact with the cooled walls of said device, whereupon they contract. The air rushing in to fill the space previously occupied by the exhaust gases causes the sound of explosion.

Our apparatus provides means whereby the exhaust gases will be expanded, equalized, cooled, condensed and reduced in pressure before contact with the outside air, to reduce the back pressure, and after mixing the gases with slightly warmed air, to deliver the mixture to the outside air without sound or smoke.

Taking the operation step by step, we will endeavor to describe the action at each stage and the means employed to produce it. A partial vacuum will be formed by the action of the stream of air through pipe 10. This partial vacuum will extend from the rear end of pipe 10 forward to the end of cylinder 8 and rearward between 8 and 5 to and including the expansion chamber.

Hot gases are forced under pressure from the cylinder—that is, they are under pressure when the exhaust valve opens. Ample room is provided for instantaneous expansion in the expansion chamber. Not only is room provided, but the partial vacuum existing in this chamber has the effect of drawing the gases out of the exhaust pipe, thus reducing the back pressure. The process of cooling begins immediately upon the emergence of the first part of the exhaust gases from the pipe since the chamber is kept comparatively cool by the contact of its wall with the air. This cooling effect is increased by the corrugations which give an effect 40% greater than that of a plain surface.

The expansion chamber performs a no less important function by its equalizing effect. As is well known, the exhaust gases emerge from the cylinders in sharp, well defined puffs. Now if space is provided for the expansion of each individual puff before the gases from one are completely removed, the next puff will come "tailing on" to the preceding one. This will equalize the flow of gases from the expansion chamber and would deaden the sound of the exhaust if no further means were employed.

The gases, after expansion, cooling and equalizing in the expansion chamber are drawn around the cylinder 8 and forward through this space of annular cross section, the walls of which (8 and 5) are corrugated and air cooled. 5 and 8 while far enough apart to allow a free and unobstructed passage, are close enough together to bring the gases in close contact with the cool metal.

As the gases advance along this passage they are further cooled and thereby reduced in volume. This tends to reduce the velocity, subjecting the gases to greater cooling by exposing them to cooling influences longer and increasing the vacuum or rather enhancing the effect of the steady pull at the rear end of 10. This can be easily seen by supposing that enough gases were generated in the expansion chamber to give a flow of gases around 10 equal to the flow of air in 10. In this case there would be no vacuum. The other extreme is, to suppose that the flow of air through 10 is maintained and no gases formed in the expansion chamber. In this case the vacuum around 10 and in the expansion chamber would attain its maximum value. The actual conditions are somewhere between these two. The value of the vacuum depends upon the velocity of air through 10, and the velocity of flow of gases between 8 and 10. The velocity of air depends upon the speed of airplane and of propeller and the form and size of funnel 9 and pipe 10. The velocity of gases through the passage 8—10 depends upon the temperature, volume and pressure of the gases liberated by the exhaust, and the size, shape and material of the walls comprising the expansion chamber and passages.

Ae the rear end of pipe 10 the gases are mixed with slightly warmed air. The cooling is completed between this point and the rear end of cylinder 8. While the mixture will still be at a temperature slightly above that of the surrounding air, its emergence into the air will cause no explosion.

It is evident that changes may be resorted to without departing from the spirit of our invention, hence we would have it understood that we do not confine ourselves to the detail shown or described.

We claim:—

1. In a muffler for internal combustion engines, the combination of a casing, an opening therein for the exhaust pipe of an engine, a cylinder within said casing having its front end terminating within said casing and its other end communicating with an opening at the rear of said casing, and an air inlet pipe entering said casing at the front thereof and terminating within and at the rear of the front end of the cylinder, whereby an unobstructed passage between the casing and cylinder and the cylinder and air inlet pipe is provided for the spent gases from said engine.

2. In a muffler for internal combustion engines, the combination of a casing provided at its rear end with a wall having an opening therein, a cylinder within said casing and open at both ends, its rear open end communicating with the opening in the end wall of the casing, and an air inlet pipe secured to the open end of the casing and terminating within and at the rear of the front end of the cylinder.

3. In a muffler for internal combustion engines, the combination of a casing having an expansion chamber, an opening therein for the exhaust pipe of an engine, and a rear end wall having an opening, a cylinder open at both ends and located within the casing with its discharge end in communication with the opening in said end wall and an air inlet pipe secured to the front end of the casing and terminating within the cylinder and behind the front end thereof.

4. In a muffler for internal combustion engines, the combination of a casing having an expansion chamber adjacent its rear end, the latter having an opening therein, a cylinder open at both ends and secured to the rear end wall of the casing and communicating with the opening in said end wall, and an air inlet pipe secured to the front end of the casing and terminating within the cylinder, the portion of said air inlet pipe within the cylinder being smaller than the internal diameter of the cylinder so as to provide for a gas passage between the cylinder and pipe.

5. In a muffler for internal combustion engines, the combination of a casing having an expansion chamber adjacent its rear end, a cylinder open at both ends and located within the casing, one end of the cylinder communicating with an opening in the rear end wall of the casing and a funnel shaped air inlet pipe at the front end of the casing, the rear end of said inlet pipe being of less diameter than the internal diameter of the cylinder and terminating within the latter.

6. In a muffler for internal combustion engines, the combination of a casing having an expansion chamber adjacent its rear end, a cylinder open at both ends and located within the casing, one end of the cylinder communicating with an opening in the rear wall of the casing, and a funnel-shaped air inlet pipe secured to the front end of the casing and terminating within the front end of the cylinder, the portion of the air inlet pipe within the cylinder being of less diameter than the internal diameter of the front end of the cylinder.

In testimony whereof we affix our signatures in presence of two witnesses.

JOHN H. PARSONS.
ANSON A. MERRICK.

Witnesses:
  A. E. HUTCHINSON,
  H. N. RAMSEY.